US006798838B1

(12) United States Patent
Ngo

(10) Patent No.: US 6,798,838 B1
(45) Date of Patent: Sep. 28, 2004

(54) SYSTEM AND METHOD FOR IMPROVING VIDEO TRANSMISSION OVER A WIRELESS NETWORK

(75) Inventor: Chiu Yeung Ngo, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/517,726

(22) Filed: Mar. 2, 2000

(51) Int. Cl.$^7$ .......................... H04N 7/12; H04N 11/02; H04N 11/04
(52) U.S. Cl. .................... 375/240.19; 375/240; 725/95; 725/96
(58) Field of Search ................................ 382/243, 240; 704/500; 348/487, 425.2, 397.1, 398.1; 725/147, 48, 54, 95, 96, 131; 375/240.15, 240.27, 240.19; 455/410

(56) References Cited

U.S. PATENT DOCUMENTS

| | | | |
|---|---|---|---|
| 5,742,343 A | | 4/1998 | Haskell et al. ............ 3448/415 |
| 5,784,573 A | | 7/1998 | Szczepanek et al. ..... 395/200.8 |
| 5,825,430 A | * | 10/1998 | Adolph et al. .............. 348/487 |
| 6,233,356 B1 | * | 5/2001 | Haskell et al. .............. 382/243 |
| 6,337,881 B1 | * | 1/2002 | Chaddha ................ 375/240.16 |
| 6,349,284 B1 | * | 2/2002 | Park et al. ................... 704/500 |
| 6,501,797 B1 | * | 12/2002 | van der Schaar et al. ...................... 375/240.12 |
| 6,510,177 B1 | * | 1/2003 | De Bonet et al. ....... 375/240.16 |

FOREIGN PATENT DOCUMENTS

EP  0928084 A2  12/1998

OTHER PUBLICATIONS

"Evaluation of Priority and Scheduling Schemes for an IEEE 802.14 MAC Protocol Loaded by Real Traffic" by Milosh V. Ivanovich et al, IEEE Infocom '98, vol. 3, Mar. 29–Apr. 2, 1998.

"Flexible and Robust Packet Transport for Digital HDTV", by Robert J. Siracusa et al, IEEE Journal on Selected Areas in Communications, vol. 11, No. 1, Jan. 1993.

* cited by examiner

*Primary Examiner*—Vivek Srivastava
*Assistant Examiner*—Matthew R. Demicco

(57) ABSTRACT

There is disclosed a wireless communication device capable of receiving an incoming RF data signal and generating therefrom a base layer data stream and at least one enhancement layer data stream. The wireless communication device comprises: 1) a base layer decoder, 2) at least one enhancement layer decoder, 3) a variable mode receiver for demodulating the RF incoming RF data signals in a plurality of physical modes, such as BPSK, QPSK, QAM, and the like, and at a plurality of code rates and 4) a receiver mode controller for controlling the physical modes of the variable mode receiver. The receiver mode controller causes a first demodulated output signal of the variable mode receiver to be transferred to the base layer decoder when the variable mode receiver is operating in a first physical mode and causes a second demodulated output signal of the variable mode receiver to be transferred to the at least one enhancement layer decoder when the variable mode receiver is operating in a second physical mode. There also is disclosed a second wireless communication device for transmitting an outgoing RF data signal comprising a base layer data stream and at least one enhancement layer data stream. The second wireless communication device comprises: 1) a base layer encoder, 2) at least one enhancement layer encoder, 3) a variable mode transmitter for modulating an input signal in a plurality of physical modes and at a plurality of code rates to produce the outgoing RF data signal; and 4) a transmitter mode controller for controlling the plurality of physical modes of the variable mode transmitter. The transmitter mode controller causes the variable mode transmitter to transmit a base layer output signal from the base layer encoder in a first physical mode and causes the variable mode transmitter to transmit at least one enhancement layer output signal from the at least one enhancement layer encoder in a second physical mode.

36 Claims, 4 Drawing Sheets

SYSTEM AND METHOD FOR IMPROVING VIDEO TRANSMISSION OVER A WIRELESS NETWORK

TECHNICAL FIELD OF THE INVENTION

The present invention is directed, in general, to video encoding systems and, more specifically, to an encoding system for transmitting streaming video in a wireless network.

BACKGROUND OF THE INVENTION

Real-time streaming of multimedia content in wireless networks has become an increasingly common application in recent years. A wide range of interactive and non-interactive multimedia applications, such as news-on-demand, live network television viewing, video conferencing, among others, rely on end-to-end streaming video or audio techniques. Unlike a downloaded video or audio file, which may be retrieved first in non-real time and viewed or played back later in real time, streaming video and audio applications require a transmitter that encodes and transmits a video or audio signal over a data network to a receiver, which must decode and display the video or audio signal in real time.

In a wireless network, it is important priority that video bit streams be delivered as reliably as possible. Layered source coding is one of the most effective schemes used to provide video transport systems with error resilience. In the layered source coding scheme, video data information is decomposed into a number of layers, each representing different perceptually relevant components of the video source. The base layer, which contains the most essential video information, can be used to generate a basic output video signal with an acceptable quality. A higher quality video signal can then be obtained by retrieving data from one or more enhancement layers that further improve the basic output video signal generated by the base layer encoder.

There are different ways for implementing layered source coding. For example, in systems with temporal domain layered coding, the base layer contains a bit stream with a low video frame rate and the enhancement layers contain incremental information for obtaining higher frame rates than possible with the original base layer. In systems with spatial domain layered coding, the base layer provides sub-sampled version codes for the original video sequence and the enhancement layers contain additional information for obtaining higher spatial resolution at the decoder.

In general, the different transport layers use different data streams with distinctly different tolerances for errors (known as channel errors) which are introduced during transport. To combat channel errors, the layered coding technique is usually combined with transport prioritization so that the base layer is delivered with a higher degree of error protection than the enhancement layers.

Transport prioritization has been implemented in a number of different ways in the prior art. One common transport prioritization method for wireless networks combines layered coding with different power levels so that each sub-stream transport layer is sent at a different transmit power level. The most important layer, the base layer is transmitted at highest power and the enhancement layers are transmitted at lower power, so that the overall power is kept within regulatory limits. The disadvantage to this method is that the finest levels of detail in the enhancement layers are transmitted at the lowest power.

In other conventional prioritization schemes, the base layer may be error checked and re-transmitted as often as necessary to ensure that it is properly received. Unfortunately, the re-transmission of the base layer occurs at the expense of transmission of the enhancement layer data.

There is therefore a need in the art for improved encoders and decoders for use in wireless networks capable of supporting real time data transmission to a mobile station, such as a video or audio receiver, a wireless computer, and the like. In particular, there is a need for improved encoders and decoders that are less susceptible to physical transport layer errors in streaming video and audio applications. More particularly, there is a need for encoders and decoders which deliver higher priority layered data using more reliable transmission modes and lower priority layered data using less reliable transmission modes.

SUMMARY OF THE INVENTION

To address the above-discussed deficiencies of the prior art, it is a primary object of the present invention to provide a wireless communication device capable of receiving an incoming RF data signal and deriving from the incoming RF data signal a base layer data stream and at least one enhancement layer data stream.

In an advantageous embodiment of the present invention, the wireless communication device comprises: 1) a base layer decoder, 2) at least one enhancement layer decoder, 3) a variable mode receiver capable of demodulating the RF incoming RF data signals in a plurality of physical modes, and 4) a receiver mode controller capable of controlling the plurality of physical modes of the variable mode receiver, wherein the receiver mode controller causes a first demodulated output signal of the variable mode receiver to be transferred to the base layer decoder when the variable mode receiver is operating in a first physical mode and causes a second demodulated output signal of the variable mode receiver to be transferred to the at least one enhancement layer decoder when the variable mode receiver is operating in a second physical mode.

According to one embodiment of the present invention, a bit error rate of the first physical mode is lower than a bit error rate of the second physical mode.

According to another embodiment of the present invention, the at least one enhancement layer decoder comprises a first enhancement layer decoder and a second enhancement layer decoder.

According to still another embodiment of the present invention, the receiver mode controller causes the second demodulated output signal of the variable mode receiver to be transferred to the first enhancement layer decoder when the variable mode receiver is operating in a second physical mode and causes a third demodulated output signal of the variable mode receiver to be transferred to the second enhancement layer decoder when the variable mode receiver is operating in a third physical mode.

According to yet another embodiment of the present invention, a bit error rate of the second physical mode is lower than a bit error rate of the third physical mode.

According to a further embodiment of the present invention, the plurality of physical modes comprise at least two of binary phase shift keying modulation, quadrature phase shift keying modulation, and quadrature amplitude modulation.

According to a still further embodiment of the present invention, the plurality of physical modes comprise a plurality of code rates.

According to a yet further embodiment of the present invention, the incoming RF data signal comprises a video signal.

According to another embodiment of the present invention, the incoming RF data signal comprises an audio signal.

It also is a primary object of the present invention to provide a wireless communication device capable of transmitting an outgoing RF data signal comprising a base layer data stream and at least one enhancement layer data stream. In an advantageous embodiment of the present invention, the wireless communication device comprises: 1) a base layer encoder, 2) at least one enhancement layer encoder, 3) a variable mode transmitter capable of modulating an input signal in a plurality of physical modes to thereby produce the outgoing RF data signal; and 4) a transmitter mode controller capable of controlling the plurality of physical modes of the variable mode transmitter, wherein the transmitter mode controller causes the variable mode transmitter to transmit a base layer output signal from the base layer encoder in a first physical mode and causes the variable mode transmitter to transmit at least one enhancement layer output signal from the at least one enhancement layer encoder in a second physical mode.

In one embodiment of the present invention, a bit error rate of the first physical mode is lower than a bit error rate of the second physical mode.

In another embodiment of the present invention, the at least one enhancement layer encoder comprises a first enhancement layer encoder and a second enhancement layer encoder.

In still another embodiment of the present invention, the transmitter mode controller causes the variable mode transmitter to transmit a first enhancement layer output signal from the first enhancement layer encoder in the second physical mode and causes the variable mode transmitter to transmit a second enhancement layer output signal from the second enhancement layer encoder in a third physical mode.

In yet another embodiment of the present invention, a bit error rate of the second physical mode is lower than a bit error rate of the third physical mode.

In a further embodiment of the present invention, the plurality of physical modes comprise at least two of binary phase shift keying modulation, quadrature phase shift keying modulation, and quadrature amplitude modulation.

In a still further embodiment of the present invention, the plurality of physical modes comprise a plurality of code rates.

In a yet further embodiment of the present invention, the incoming RF data signal comprises a video signal. According to another embodiment of the present invention, the incoming RF data signal comprises an audio signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise" and derivatives thereof mean inclusion without limitation; the term "or" is inclusive, meaning and/or; the phrases "associated with" and "associated therewith" and derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
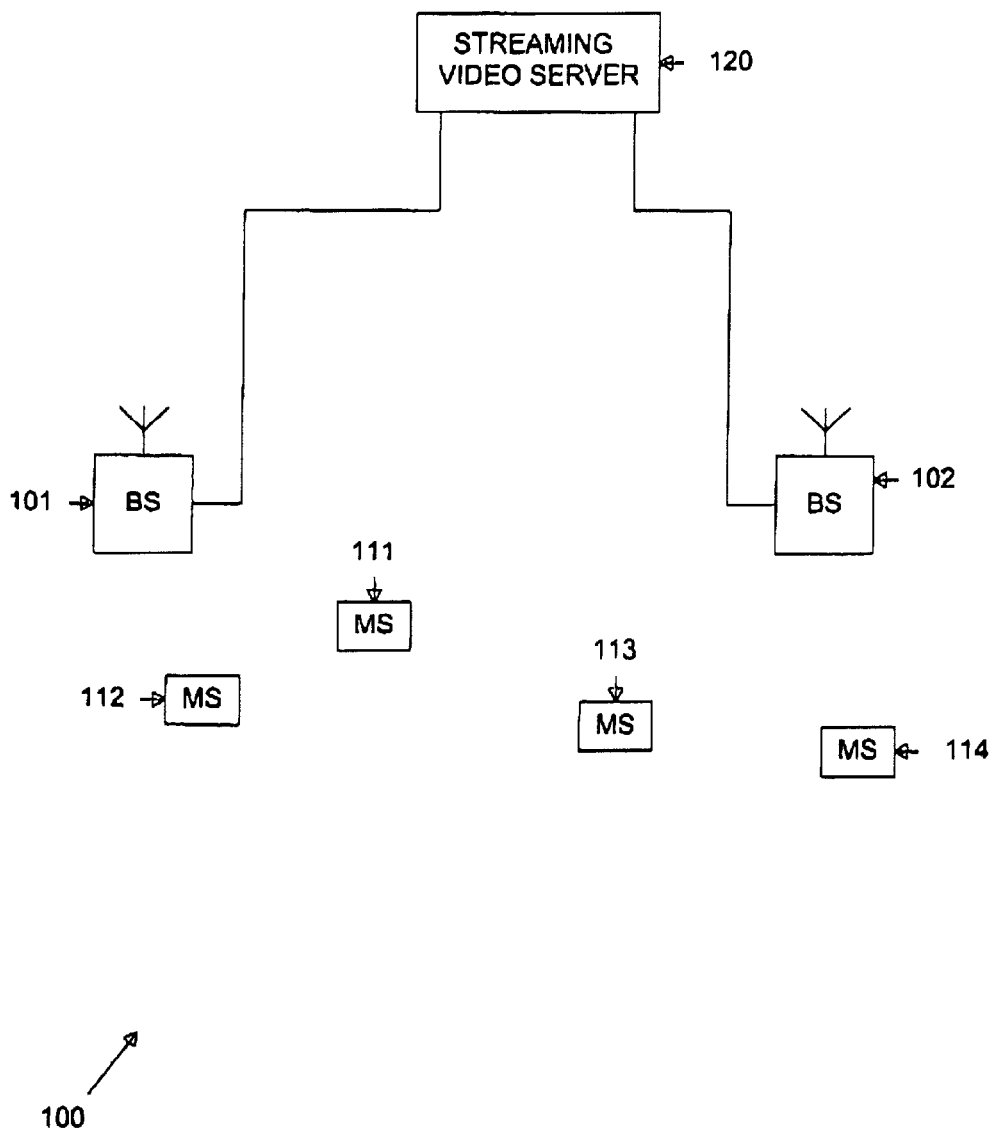
FIG. 1 illustrates a general overview of an exemplary wireless network with streaming video or audio capability according to one embodiment of the present invention.

FIG. 1 illustrates a general overview of wireless network 100 with streaming video and/or audio capability. For the sake of simplicity in explaining the principles of the present invention, the majority of the description that follows will discuss the transmission of a real time video signal from a base station to a mobile station or from one mobile station to another mobile station. However, it should be clearly understood that the principles of the present invention are by no means limited to the wireless transmission of video signals. In fact, a transport priority system according to the principles of the present invention may be used to transmit and to receive any type of layered data having different levels of priority between layers, including streaming video signals, streaming audio signals, and other types of layered real time signals.

Wireless network 100 comprises streaming video server 120, base stations (BS) 101 and 102, and mobile stations (MS) 111, 112, 113, and 114. Wireless network 100 may be any suitable network that communicates according to the IEEE 802.11a wireless network standard. Wireless network 100 may include portions of both public data networks, such as the Internet, and private data networks, such as an enterprise-owned local area network (LAN) or wide area network (WAN).

Streaming video server 120 operates in wireless network 100 to transfer real time video frames to BS 101 and BS 102. Streaming video server 120 may be any one of a wide variety of video sources including a data network server, a cable network, a desktop personal computer (PC), or the like. BS 101 and BS 102 receive streaming video data, such as MPEG-4 or the like, from streaming video server 120 and transmit it to MS 111–114. BS 101 and BS 102 may transmit the layered data according to priority level to MS 111–114. Each of MS 111–114 may comprise any suitable wireless device for communicating with BS 101 or BS 102 or, in some cases, each other, including television receivers, radio receivers, cellular telephones, portable computers, personal communication system (PCS) devices, and the like. One or more of MS 111–114 may be capable of decoding and displaying video data received from wireless network 100. In addition, two or more of mobile stations 111–114 may also be capable of communicating directly with each other without transmitting through BS 101 or BS 102. This capability to communicate with each other includes the capability to encode and to decode layered video data and to transmit and to receive the same.

Figure 2:
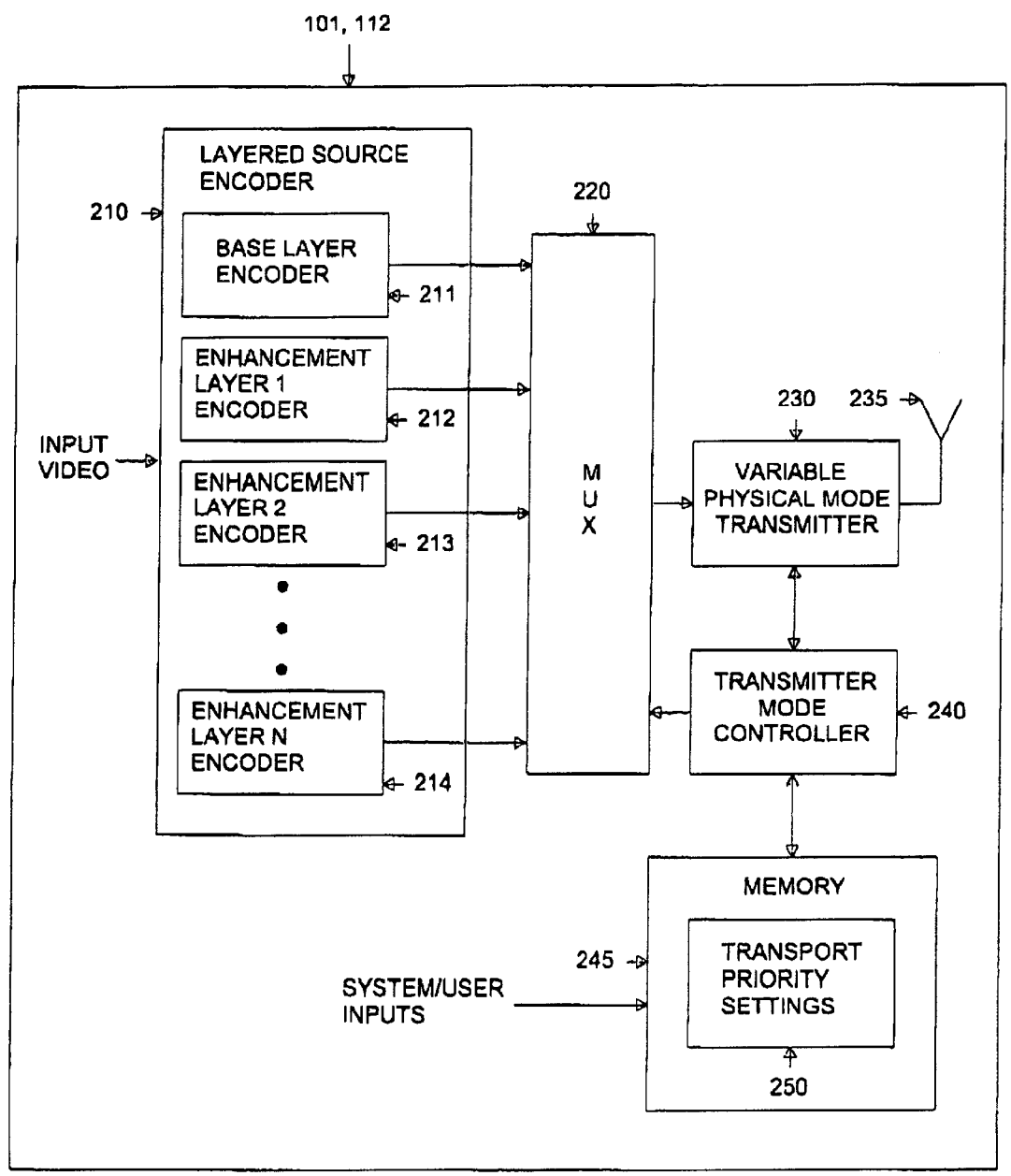
FIG. 2 illustrates a view of selected portions of the mobile stations and the base stations in the exemplary wireless network in FIG. 1 that perform layer source encoding according to one embodiment of the present invention.

FIG. 2 illustrates a selected transmission portion of exemplary base station 101 and exemplary mobile station 112 that performs layered video source encoding according to one embodiment of the present invention. The selected transmission portion of exemplary BS 101 and MS 112 comprises layered source encoder 210, multiplexer 220, variable physical mode transmitter 230, antenna 235, transmitter mode controller 240, and memory 245, which stores transport priority settings 250. Layered source encoder 210 further comprises base layer encoder 211, and N enhancement layer encoders, including exemplary enhancement layer encoders 212–214 (arbitrarily labeled Enhancement Layer 1 Encoder, Enhancement Layer 2 Encoder, and Enhancement Layer N Encoder, respectively).

Layered source encoder 210 receives the input video signal and encodes the input video signal into a base layer and up to N enhancement layers. The base layer has the highest priority level and enhancement layer 1 has the next highest priority level.

Enhancement layer N has the lowest priority level. Base layer encoder 211 encodes the base layer data stream in compliance with MPEG-4, for example. In a similar manner, enhancement layer encoder 212, enhancement layer encoder 213, and enhancement layer encoder 214 independently encode additional enhancement layer video streams. Multiplexer 220 receives the encoded base layer data stream and one or more encoded enhancement layer data streams from layered source encoder 210. Multiplexer 220, under the control of transmitter mode controller 240, may sequentially multiplex the encoded base layer data stream and up to N encoded enhancement data layers to produce an input data steam to variable physical mode transmitter 230.

Variable physical mode transmitter 230, operating under the control of transmitter mode controller 240, modulates each layer of the data stream from multiplexer 220 according to the physical mode selected by transmitter mode controller 240. The physical mode for each layer is determined by the priority level of the respective layer. The output of variable physical mode transmitter 230 is transmitted to the mobile stations by antenna 235. Transmitter mode controller 240 controls the operation of multiplexer 220 and variable physical mode transmitter 230 according to system-defined or user-defined transport priority settings 250 in memory 245.

Transmitter mode controller 240 operates in response to transport priority settings 250 to cause BS 101 or MS 112 to switch data from multiplexer 220 according to different priority levels and in compliance with IEEE 802.11a standard for wireless networks. IEEE 802.11a is selected for this embodiment since it supports data packet transmission with different modulation and error protection schemes and at different data rates, as illustrated in Table 1. As shown, transmitter mode controller 240 also provides an output signal which conforms with requirements for 64-carrier orthogonal frequency division multiplex (OFDM) radio networks.

TABLE 1

| PHYSICAL MODE | DATA RATE (Mbps) | RELIABILITY INDEX |
| --- | --- | --- |
| BPSK-Code Rate = 1/2 | 6 | very very high |
| BPSK-Code Rate = 3/4 | 9 | very high |
| QPSK-Code Rate = 1/2 | 12 | high |
| QPSK-Code Rate = 3/4 | 18 | medium |
| 16QAM-Code Rate = 1/2 | 24 | low |
| 16QAM-Code Rate = 3/4 | 36 | very low |
| 64QAM-Code Rate = 3/4 | 54 | very very low |

The duration of one OFDM symbol is equal to 4 microseconds. In Table 1, BPSK means binary phase shift keying; QPSK means quadrature phase shift keying; and QAM means quadrature amplitude modulation.

Transport priority settings 250 maps each encoded data stream output by layered source encoder 210 according to its priority level and to a comparable reliability index and physical mode supported by IEEE 802.11a networks. A physical mode in this scenario equates to a different modulation technique.

An exemplary transport priority settings 250 mapping of different priority source code layers to the physical transport modes is shown below in Table 2. Thus, physical mode transmitter 230 transmits each layer from multiplexer 220 according to Table 2. The most important layered data streams (e.g., Base Layer and Enhancement Layer 1) are transmitted in physical modes that have the highest reliability (i.e., lowest error rate). Less important layered data streams (e.g., Enhancement Layer 2, Enhancement Layer 3, etc.) are transmitted in physical modes that have lower reliability indexes (i.e., higher error rate), but higher data transmission rates.

TABLE 2

| CODED LAYER | PHYSICAL MODE | DATA RATE (Mbps) | RELIABILITY INDEX |
| --- | --- | --- | --- |
| Base Layer | BPSK Code Rate = 1/2 | 6 | very very high |
| Enhancement Layer 1 | BPSK Code Rate = 3/4 | 9 | very high |
| Enhancement Layer 2 | QPSK Code Rate = 1/2 | 12 | high |
| Enhancement Layer 3 | QPSK Code Rate = 3/4 | 18 | medium |
| Enhancement Layer 4 | 16QAM Code Rate = 1/2 | 24 | low |
| Enhancement Layer 5 | 16QAM Code Rate = 3/4 | 36 | very low |
| Enhancement Layer 6,7, . . . | 64QAM Code Rate = 3/4 | 54 | very very low |

Figure 3:
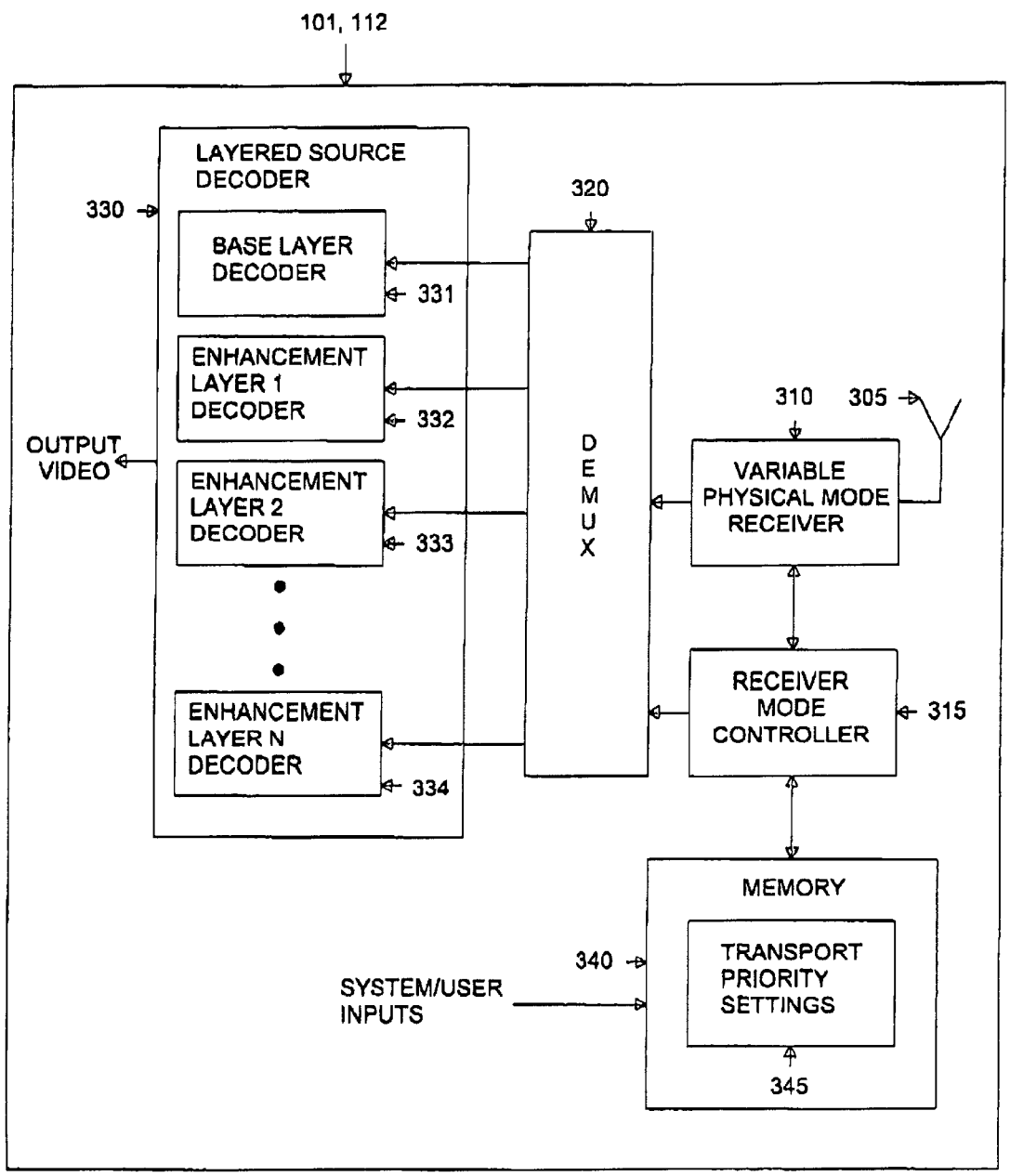
FIG. 3 illustrates a view of selected portions of the mobile stations and the base stations in the exemplary wireless network in FIG. 1 that perform layered source decoding according to one embodiment of the present invention.

FIG. 3 illustrates a selected receiver portion of exemplary base station 101 and exemplary mobile station 112 that performs layered video source decoding according to one embodiment of the present invention. The selected receiver portion of BS 101 and MS 112 receives and decodes an incoming RF signal data conforming to the characteristics described in Table 2, reversing the process described for FIG. 2 to create an output video signal (output video) which approximates the original input video.

The selected portion of BS 101 and MS 112 comprises antenna 305, variable physical mode receiver 310, receiver mode controller 315, de-multiplexer (demux) 320, layered source decoder 330, and memory 340, which stores transport priority settings 345. Layered source decoder 330 further comprises base layer decoder 331, and N enhancement layer decoders, including exemplary enhancement layer decoders 332–334 (arbitrarily labeled Enhancement Layer 1 Decoder, Enhancement Layer 2 Decoder, and Enhancement Layer N Decoder, respectively).

Variable physical mode receiver 310, operating under the control of receiver mode controller 315, demodulates the incoming RF signal from antenna 305 in a plurality of physical modes in order to generate base layer and enhancements layer data streams for transfer to demultiplexer 320. Receiver mode controller 315 controls the operation of demultiplexer 320 and variable physical mode receiver 310 as directed by transport priority settings 345 in memory 340. For instance, as the base layer RF signal is being received, variable physical mode receiver 310 demodulates the base layer RF signal in the same physical mode in which the base layer data stream was modulated. Next, when the Enhancement Layer 1 RF signal is being received, variable physical mode receiver 310 switched physical modes and demodulates the Enhancement Layer 1 RF signal in the same physical mode in which the Enhancement Layer 1 data stream was modulated. Receiver mode controller 315 causes demultiplexer 320 to switch the base layer data stream and enhancement layer data streams generated by variable physical mode receiver 310 to the corresponding base layer decoder or enhancement layer decoder according to the priority levels set forth in Table 2. The decoded base layer and enhancement layer data streams are combined in layer source decoder 330 to produce an output video signal that approximates the original input video signal.

In an alternate embodiment of present invention, variable physical mode transmitter 230 and variable physical mode receiver 310 may be configured to transfer the base layer of video data in the second best physical mode available in IEEE 802.11a (e.g., BPSK, code rate=3/4, 9 Mbps) with each enhancement layer being transferred at the sequentially lower level priority scheme.

For instance, variable physical mode transmitter 230 and variable physical mode receiver 310 may transmit enhancement layer 1 data at QPSK with code rate=1/2 and at 12 Mbps. This enhancement layer 1 transfer equates to data transfer with a high reliability index instead of a very high reliability index.

Various other embodiments are available using different combinations of transmit priority levels available with IEEE 802.11a. In an alternate embodiment of the present invention, variable physical mode transmitter 230 may be replaced by N+1 RF transmitters, each of which modulates and transmits either the base layer data stream or one of-the enhancement layer data streams.

Similarly, variable physical mode receiver 310 may be replaced by N+1 RF receivers, each of which receives and demodulates either an incoming base layer RF signal or one of the incoming enhancement layer RF signals.

Figure 4:
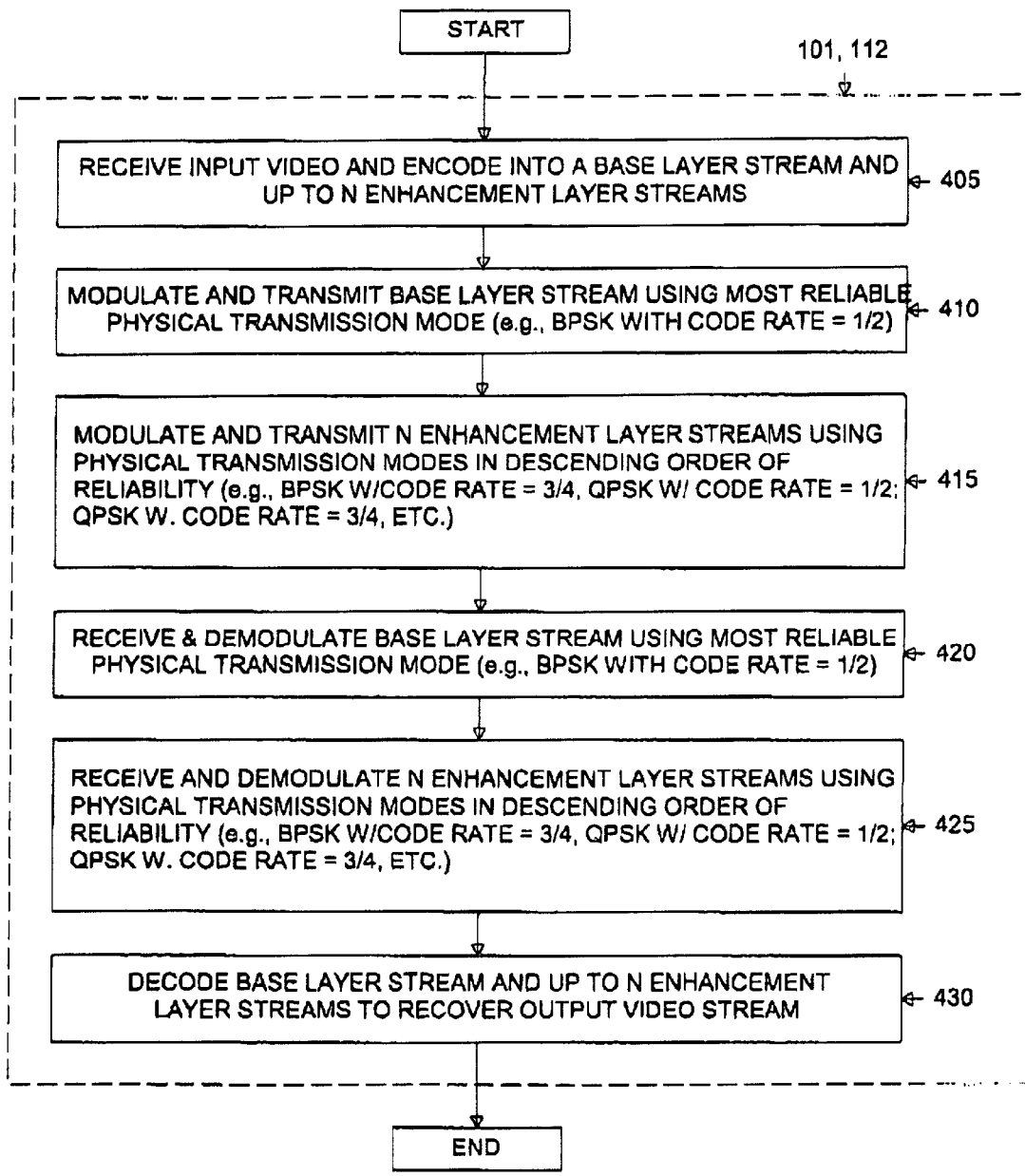
FIG. 4 is a flow chart illustrating communications between an exemplary base station and mobile station according to one embodiment of the present invention.

FIG. 4 depicts flow chart 400, which illustrates the operation of exemplary BS 101 and MS 112 according to one embodiment of the present invention. First, layered source encoder 210 encodes the input video signal received by BS 101 into a compressed base layer stream and up to N compressed enhancement layers streams (process step 405). Next, multiplexer 220 transfers the encoded base layer stream and up to N enhancement layer streams to variable physical mode transmitter 230, as directed by transmitter mode controller 240.

Operating under the direction of transmitter mode controller 240, variable physical mode transmitter 230 modulates and transmits the encoded base layer stream through antenna 235 to network 100, using the most reliable physical transmission mode (e.g., BPSK with code rate=1/2) (process step 410).

Transmitter mode controller 240 then causes variable physical mode transmitter 230 to separately modulate and transmit up to N enhancement layer streams using different physical transmission modes. Transmitter mode controller 240 assigns the physical transmission mode for each sequential enhancement layer stream with a descending order of reliability when compared to the base layer and each other. For example, enhancement layer 1 stream may be transmitted in BPSK with a code rate equal to 3/4, which is lower than the reliability rate associated with the base layer stream.

This may be followed by transmission of enhancement layer 2 stream in lower reliability QPSK with a code rate equal to 1/2, enhancement layer 3 stream in QPSK with a lower reliability code rate equal to 3/4, and so forth (process step 415).

Next, variable physical mode receiver 310 in MS 112 receives the encoded base layer stream through antenna 305. Variable physical mode receiver 310, operating under the direction of receiver mode controller 315, demodulates the base layer stream according to how it was transmitted (e.g., BPSK with a code rate equal to 1/2) (process step 420). Next, variable physical mode receiver 310 receives and demodulates up to N enhancement layer streams according to the appropriate physical transmission mode as described for BS 101 (process step 425). Variable source decoder 330 receives the base layer stream and up to N enhancement layer streams from variable physical mode receiver 310 through demultiplexer 320. Variable source decoder 330 decodes the base layer stream and up to N enhancement layer streams to generate a recovered output video signal which corresponds with the input video signal as originally received by BS 101 (process step 430).

Although the present invention has been described in detail, those skilled in the art should understand that they can make various changes, substitutions and alterations herein without departing from the spirit and scope of the invention in its broadest form.

What is claimed is:

1. A wireless communication device capable of receiving an incoming RF data signal and generating from said incoming RF data signal a base layer data stream and at least one enhancement layer data stream, said wireless communication device comprising:

a base layer decoder;

at least one enhancement layer decoder;

a variable mode receiver capable of demodulating said RF incoming RF data signals in a plurality of physical modes according to the type of modulation, wherein each type of modulation corresponds to a respective layer, so that each of the plurality of physical modes is demodulated into a separate data stream representing one of the base layer data stream and said at least one enhancement layer data stream ; and a receiver mode controller capable of controlling said plurality of physical modes of said variable mode receiver, wherein said receiver mode controller causes a first demodulated output signal of said variable mode receiver to be transferred to said base layer decoder when said variable mode receiver is operating in a first physical mode and causes a second demodulated output signal of said variable mode receiver to be transferred to said at least one enhancement layer decoder when said variable mode receiver is operating in a second physical mode.

2. The wireless communication device as set forth in claim 1 wherein a bit error rate of said first physical mode is lower than a bit error rate of said second physical mode.

3. The wireless communication device as set forth in claim 1 wherein said at least one enhancement layer decoder comprises a first enhancement layer decoder and a second enhancement layer decoder.

4. The wireless communication device as set forth in claim 3 wherein said receiver mode controller causes said second demodulated output signal of said variable mode receiver to be transferred to said first enhancement layer decoder when said variable mode receiver is operating in a second physical mode and causes a third demodulated output signal of said variable mode receiver to be transferred to said second enhancement layer decoder when said variable mode receiver is operating in a third physical mode.

5. The wireless communication device as set forth in claim 4 wherein a bit error rate of said second physical mode is lower than a bit error rate of said third physical mode.

6. The wireless communication device as set forth in claim 1 wherein said plurality of physical modes comprise at least two of binary phase shift keying modulation, quadrature phase shift keying modulation, and quadrature amplitude modulation.

7. The wireless communication device as set forth in claim 1 wherein said plurality of physical modes comprise a plurality of code rates.

8. The wireless communication device as set forth in claim 1 wherein said incoming RF data signal comprises a video signal.

9. The wireless communication device as set forth in claim 1 wherein said incoming RF data signal comprises an audio signal.

10. A wireless communication device capable of transmitting an outgoing RF data signal comprising a base layer data stream and at least one enhancement layer data stream, said wireless communication device comprising:

a base layer encoder;

at least one enhancement layer encoder;

a variable mode transmitter capable of modulating an input signal in a plurality of physical modes to thereby produce said outgoing RF data signal so that different physical modes of modulated transmission correspond to one of the base layer data stream and said at least one enhancement layer data stream; and a transmitter mode controller capable of controlling said plurality of physical modes of said variable mode transmitter, wherein said transmitter mode controller causes said variable mode transmitter to transmit a base layer output signal from said base layer encoder in a first physical mode and causes said variable mode transmitter to transmit at least one enhancement layer output signal from said at least one enhancement layer encoder in a second physical mode.

11. The wireless communication device as set forth in claim 10 wherein a bit error rate of said first physical mode is lower than a bit error rate of said second physical mode.

12. The wireless communication device as set forth in claim 10 wherein said at least one enhancement layer encoder comprises a first enhancement layer encoder and a second enhancement layer encoder.

13. The wireless communication device as set forth in claim 12 wherein said transmitter mode controller causes said variable mode transmitter to transmit a first enhancement layer output signal from said first enhancement layer encoder in said second physical mode and causes said variable mode transmitter to transmit a second enhancement layer output signal from said second enhancement layer encoder in a third physical mode.

14. The wireless communication device as set forth in claim 13 wherein a bit error rate of said second physical mode is lower than a bit error rate of said third physical mode.

15. The wireless communication device as set forth in claim 10 wherein said plurality of physical modes comprise at least two of binary phase shift keying modulation, quadrature phase shift keying modulation, and quadrature amplitude modulation.

16. The wireless communication device as set forth in claim 10 wherein said plurality of physical modes comprise a plurality of code rates.

17. The wireless communication device as set forth in claim 10 wherein said incoming RF data signal comprises a video signal.

18. The wireless communication device as set forth in claim 10 wherein said incoming RF data signal comprises an audio signal.

19. For use in a wireless communication device capable of receiving an incoming RF data signal comprising a base layer RF signal and at least one enhancement layer RF signal, a method of processing the RF data signal comprising the steps of:

demodulating the base layer RF signal in a first physical mode to thereby generate a base layer data stream;

demodulating the at least one enhancement RF signal in a second physical mode to thereby generate at least one enhancement layer data stream;

wherein the demodulation of the base layer RF signal and said at least one enhancement RF signal into said first physical mode and said second physical mode includes using different types of demodulation that correspond to a respective layer of said base layer and said at least one enhancement layer;

decoding the base layer data stream in a base layer decoder;

decoding the at least one enhancement layer data stream in at least one enhancement layer decoder; and combining the output of the base layer decoder and the at least one enhancement layer decoder to generate a final output signal.

20. The method as set forth in claim 19 wherein a bit error rate of the first physical mode is lower than a bit error rate of the second physical mode.

21. The method as set forth in claim 19 wherein the at least one enhancement layer decoder comprises a first enhancement layer decoder and a second enhancement layer decoder.

22. The method as set forth in claim 21 wherein the step of demodulating the at least one enhancement RF signal comprises the sub-steps of:

demodulating a first enhancement layer signal in the second physical mode to generate a first enhancement layer data stream; and demodulating a second enhancement layer signal in a second physical mode to generate a second enhancement layer data stream.

23. The method as set forth in claim 22 wherein a bit error rate of the second physical mode is lower than a bit error rate of the third physical mode.

24. The method as set forth in claim 19 wherein the plurality of physical modes comprise at least two of binary phase shift keying modulation, quadrature phase shift keying modulation, and quadrature amplitude modulation.

25. The method as set forth in claim 19 wherein the plurality of physical modes comprise a plurality of code rates.

26. The method as set forth in claim 19 wherein the final output signal comprises a video signal.

27. The method as set forth in claim 19 wherein the final output signal comprises an audio signal.

28. For use in a wireless communication device capable of transmitting to at least one receiver an incoming data signal, a method of processing the incoming data signal comprising the steps of encoding the incoming data signal in a base layer encoder to generate therefrom a base layer data stream;

encoding the incoming data signal in at least one enhancement layer encoder to generate therefrom at least one enhancement layer data stream;

modulating the base layer data stream in a first physical mode to thereby generate a base layer RF signal; and modulating the at least one enhancement layer data stream in a second physical mode to thereby generate at least one enhancement layer RF signal;

wherein each respective physical mode of modulated transmission correspond to one of the base layer data stream and said at least one enhancement layer data stream.

29. The method as set forth in claim 28 wherein a bit error rate of the first physical mode is lower than a bit error rate of the second physical mode.

30. The method as set forth in claim 28 wherein the at least one enhancement layer encoder comprises a first enhancement layer encoder and a second enhancement layer encoder.

31. The method as set forth in claim 30 wherein the step of modulating the at least one enhancement layer data stream comprises the sub-steps of:

modulating a first enhancement layer data stream in the second physical mode to generate a first enhancement layer RF signal; and modulating a second enhancement layer data stream in a third physical mode to generate a second enhancement layer RF signal.

32. The method as set forth in claim 31 wherein a bit error rate of the second physical mode is lower than a bit error rate of the third physical mode.

33. The method as set forth in claim 28 wherein the plurality of physical modes comprise at least two of binary phase shift keying modulation, quadrature phase shift keying modulation, and quadrature amplitude modulation.

34. The method as set forth in claim 28 wherein the plurality of physical modes comprise a plurality of code rates.

35. The method as set forth in claim 28 wherein the incoming data signal comprises a video signal.

36. The method as set forth in claim 28 wherein the incoming data signal comprises an audio signal.

* * * * *